United States Patent [19]

Russell et al.

[11] 4,082,018

[45] Apr. 4, 1978

[54] MACHINE TOOL AUTOMATION

[75] Inventors: John X. Russell, Troy; Kenneth T. Liske, Sterling Heights, both of Mich.

[73] Assignee: The Babcock & Wilcox Company, New York, N.Y.

[21] Appl. No.: 670,804

[22] Filed: Mar. 26, 1976

[51] Int. Cl.² .......................... B23B 13/00; B23Q 5/22
[52] U.S. Cl. .................................... 82/2.5; 214/1 BB; 214/1 BD
[58] Field of Search ................. 82/2.5, 2.7; 214/1 BB, 214/1 BC, 1 BD

[56] References Cited

U.S. PATENT DOCUMENTS

| | | | |
|---|---|---|---|
| 2,714,324 | 8/1955 | Dinsmore et al. | 82/2.7 |
| 2,927,703 | 3/1960 | Rainey et al. | 214/1 BB |
| 2,991,892 | 7/1961 | Haas | 214/1 BB |
| 3,124,257 | 3/1964 | Price et al. | 82/2.5 X |
| 3,572,520 | 3/1971 | Evans et al. | 214/1 BB |
| 3,651,958 | 3/1972 | Evans et al. | 214/1 BB |
| 3,658,190 | 4/1972 | Fournier | 214/1 BB |

*Primary Examiner*—Harrison L. Hinson
*Attorney, Agent, or Firm*—J. M. Maguire; John F. Luhrs

[57] ABSTRACT

A system for the automatic repetitive transfer of rough workpieces from a conveyor to the machining position in a machine tool and the transfer of finished workpieces from the machining position to the conveyor.

13 Claims, 6 Drawing Figures

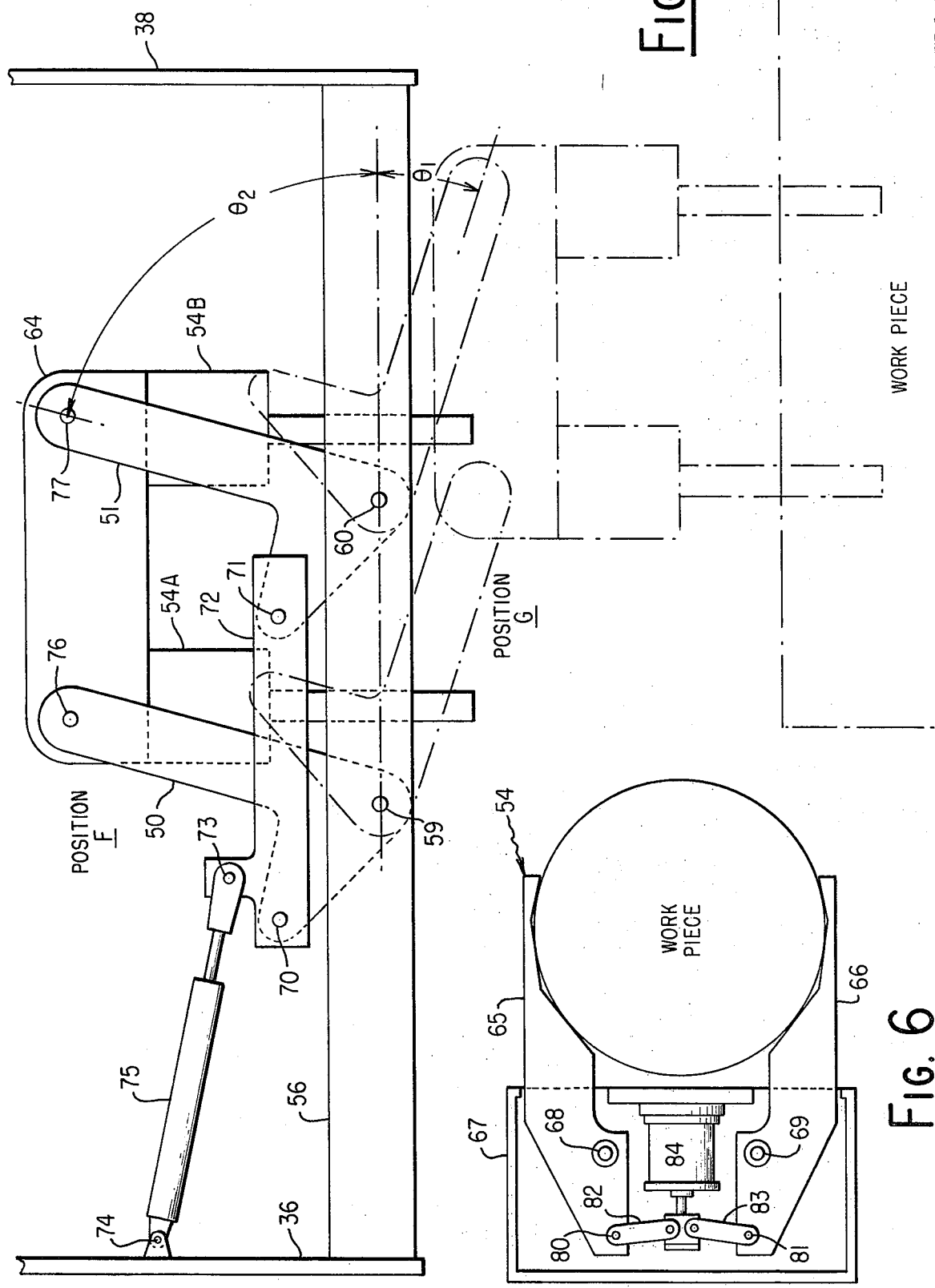

MACHINE TOOL AUTOMATION

This invention relates to machine tool automation wherein, during each cycle of operation, a rough workpiece is transferred from a conveyor to the machining position in a machine tool, and upon completion of the machining operation the workpiece is removed from the machine tool and returned to the conveyor. More particularly, this invention relates to such a system wherein, during each cycle of operation, immediately upon completion of the machining operation the finished workpiece is removed from the machining position and a rough workpiece placed in the machining position. the finished workpiece is then transferred to a conveyor, a rough workpiece is picked up from the conveyor, and transferred to a position parallel to, but displaced sideways, from the machining position ready to be put into the machining position immediately upon completion of the machining operation and removal of the finished workpiece from the machine tool.

An object of the invention is to provide machine tool automation having a high degree of reliability.

Another object of the invention is to provide such automation requiring a minimum of floor space.

A further object of the invention is to provide such automation wherein machine tool idle time is entirely eliminated or substantially reduced.

Still another object of the invention is to provide such automation requiring a mininum of maintenance, increased operator accessibility and maximum operator safety.

A further object of the invention is to provide such automation capable of handling workpieces having a wide variety of sizes, shapes and weights, limited only by the capabilities of the machine tool with which it is associated.

Still another object of the invention is to provide such automation readily adaptable for use with a wide variety of machine tools, such as, but not limited to, lathes, boring mills, grinding machines and milling machines.

A further object of the invention is to provide such automation which is self supporting and independent of the machine tool with which it is associated, thus requiring no structural changes in the latter.

Still another object of the invention is to provide such automation requiring a single conveyor for the transport of workpieces to and from the machine tool.

A further object of the invention is to provide such automation wherein human labor is eliminated in the loading and unloading of machine tools and the transfer of workpieces to and from machine tools.

These and other objects will be apparent from the following description and the drawings in which:

IN THE DRAWINGS

FIGS. 4 and 5 are front elevation and top plan views respectively of a typical put and take module.

FIG. 6 is a side elevation view of a mechanical hand for grasping, holding and releasing workpieces.

DETAILED DESCRIPTION

Figure 1:
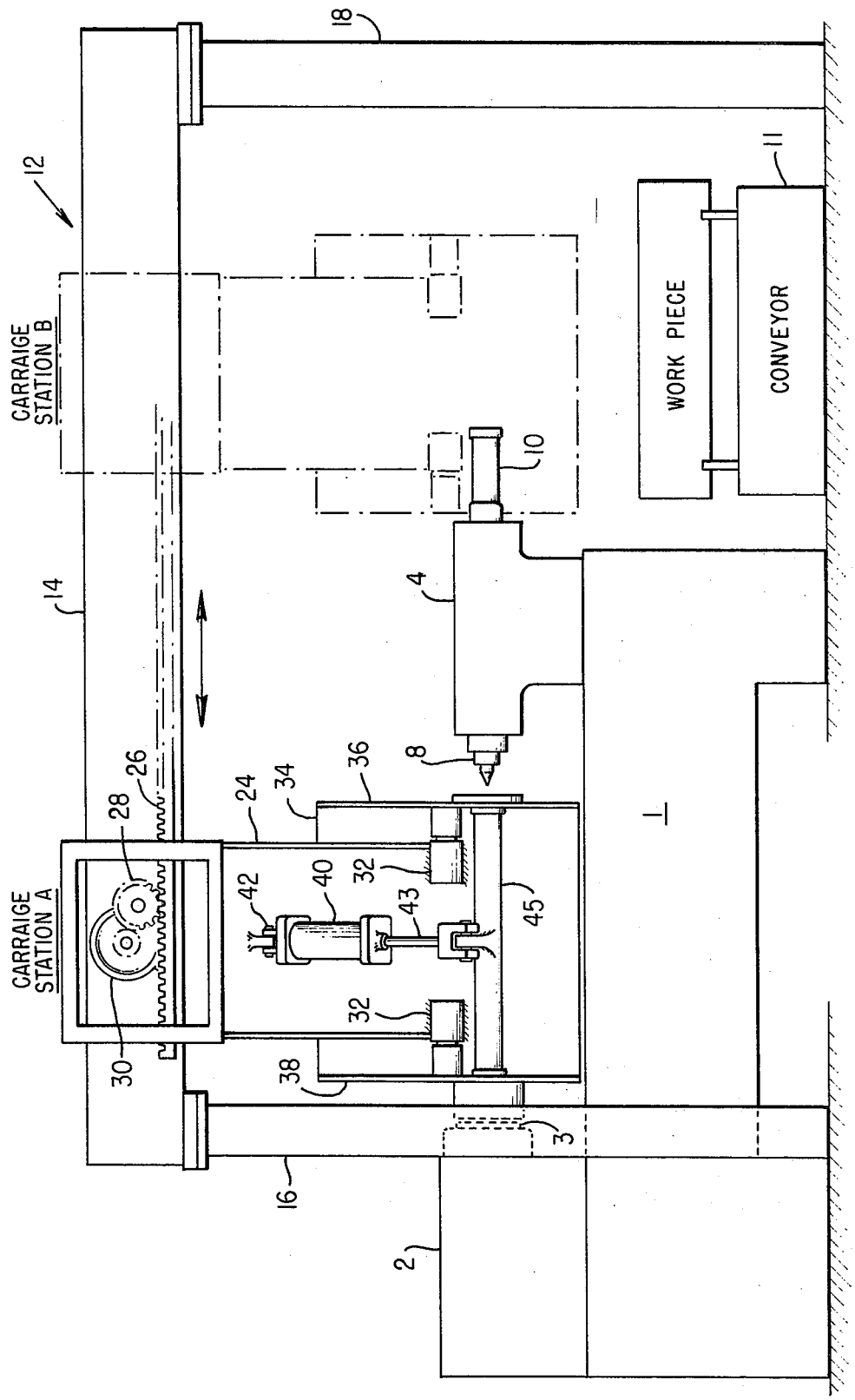
FIG. 1 is a side elevation view of the automation as applied to a horizontal lathe for the production turning of workpieces.
Figure 2:
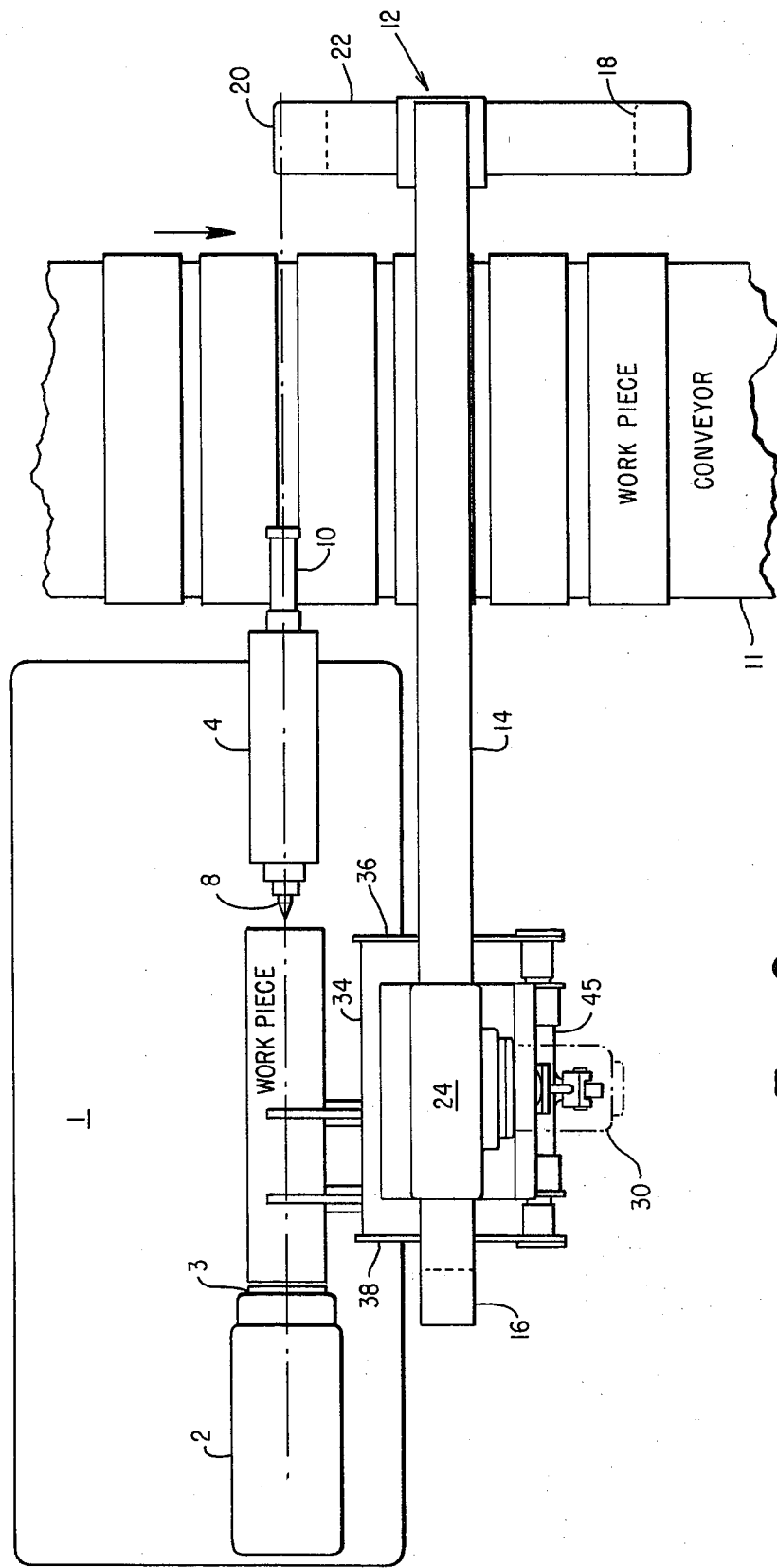
FIG. 2 is a plan view of the automation and lathe shown in FIG. 1.

Referring now to the drawings wherein like reference characters designate like or corresponding parts throughout the several views, there is shown a lathe generally indicated at 1, having a headstock 2 and a tailstock 4. The headstock 2 incorporates a chuck, or other workpiece holding device, 3, adapted to be rotated at preselected speeds for the automatic clamping and releasing of workpieces. Journaled in the tailstock 4 is a spindle 8, movable toward and away from the headstock 2 by means of a servomotor 10 at preselected points in each cycle of operation.

In the interest of simplicity there has not been shown the usual carriage and slide for holding and positioning a cutting tool and the mechanism for having the carriage automatically traverse the workpiece, and upon completion of the traverse return to the starting position adjacent the headstock for a repeat operation after removal of the finished workpiece from the machining position and the positioning of a rough workpiece into the machining position.

The automation now to be described, in the initial cycle of operation, takes a rough workpiece from a conveyor 11, transports it to a position parallel to, but displaced sideways, from the machining position, puts the workpiece in machining position, during the machining operation takes a second rough workpiece from the conveyor 11, transports it to the position parallel to, but displaced sideways, from the machining position, upon completion of the machining operation, takes the finished workpiece from the machining position, puts the second rough workpiece in machining position and returns the finished workpiece to the conveyor 11. Following the initial cycle, the automation continuously cycles to take a rough workpiece from the conveyor 11, transport it to the position parallel to, but displaced sideways, from the machining position, take a finished workpiece from the machining position, put the rough workpiece in machining position and return the finished workpiece to the conveyor 11.

As shown in the drawings, there is a gantry, generally indicated at 12, having a horizontal rail 14, running parallel to, but displaced sideways from the centerline of the lathe 1, supported by a post 16 at the headstock end and by posts 18 and 20, carrying a cross beam 22 at the tailstock end of the lathe. Carried by the rail 14 is a carriage 24 adapted to be cyclically shuttled between a machine tool load and unload Station A and a conveyor load and unload Station B by any conventional means such as a lead screw, timing belt or the like, but for purposes of illustration shown as comprising a rack 26, secured to the rail 14, meshing with a pinion 28 mounted on carriage 24 rotatable clockwise and counterclockwise by a reversing servomotor 30, also mounted on carriage 24.

Figure 3:
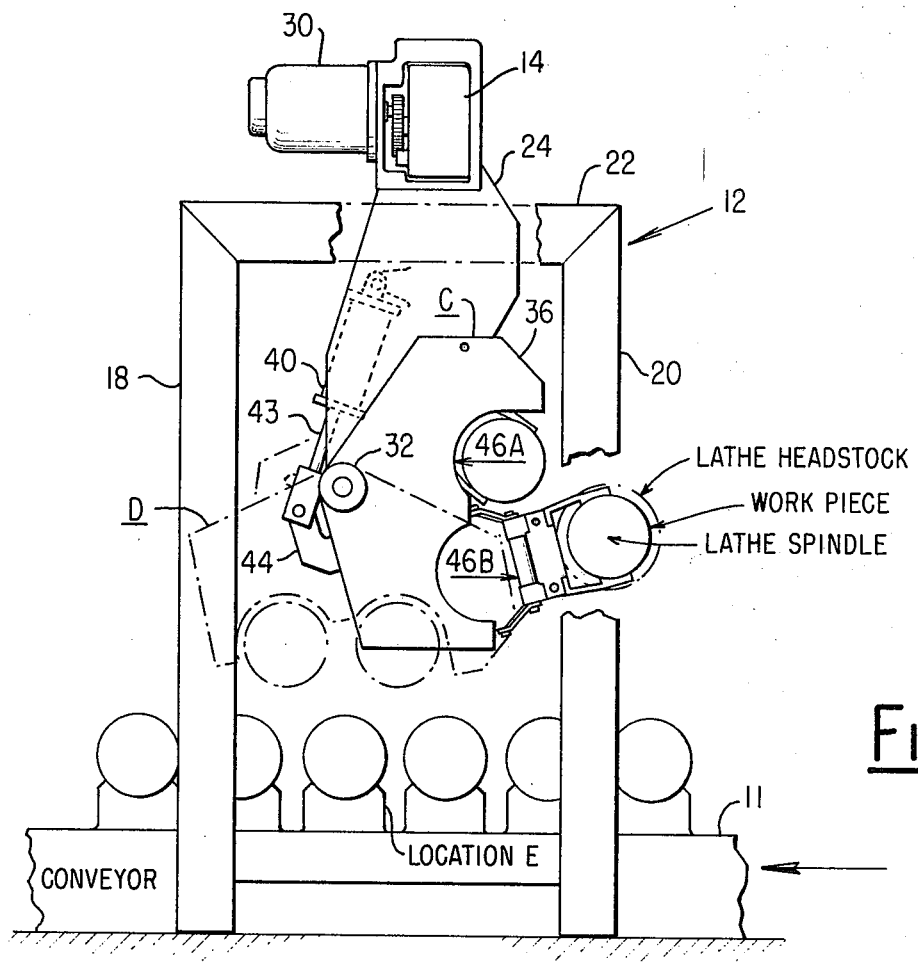
FIG. 3 is an end view of the automation shown in FIGS. 1 and 2.

Pivotly mounted on the carriage 24 by bearings 32 is a cradle 34, having sides 36 and 38, adapted to be rotated between a Position C, shown in solid line in FIG. 3, and a Position D shown in dot-dash line, by means of a servomotor comprising a hydraulic cylinder 40 supported by the carriage 24 through a bearing 42, having a piston rod 43, pivotally connected to the sides 36 and 38 of cradle 34 through an arm 44 and cross member 45. Through conventional control mechanisms (not shown) the cradle 34 is held in a Position C, when the carriage is at Station A and shuttling between Stations A and B and rotated to Position D by the servomotor when at Station B.

Supported within the cradle 34 are two identical Put-and-Take Modules 46, identified in FIG. 3 as an upper module 46A, shown in a retracted position, and a lower module 46B shown in an extended position. With a module 46 in the retracted position, carriage 24 at Station A, and the cradle 34 in Position C, the arrangement is such that the center line of a workpiece carried by the module is parallel to but radially displaced from the center line of the lathe machining position. With a module 46 in the extended position and the carriage 24 at Station A, the center line of a workpiece carried by the module is coincident with the center line of the lathe machining position. Similarly, with the carriage 24 at Station B, the cradle in Position D, and a module 46 in the retracted position, the arrangement is such that the center line of a workpiece carried by the module is parallel to, but radially displaced from the transverse center line of Location E on the conveyor 11; whereas with the module in an extended position the center line of a workpiece carried thereby is substantially coincident with the transverse center line of Location E, and hence the workpiece may be deposited on the conveyor 11.

In the embodiment of the invention herein illustrated and described, during each cycle of operation, starting with the carriage 24 at Station B and the cradle 34 in Position D, the module 46A is moved to the extended position and removes a rough workpiece from Location E and is then moved to the retracted position. Immediately thereafter module 46B, carrying a finished workpiece, is moved to the extended position, deposits the finished workpiece on the conveyor 11 at Location E, and is then moved to the retracted position. Thereafter conveyor 11 is advanced by an increment (through instrumentalities, not shown) so that the next in line rough workpiece is brought to Location E. Concurrently, the cradle 34 is rotated to Position C, the carriage 24 is shuttled to Location A, module 46B is moved to the extended position, removes a finished workpiece from the lathe, is retracted, module 46A is then moved to the extended position to bring the rough workpiece carried thereby into the machining position, and is retracted. The carriage 24 is then returned to Station B and the cradle 34 rotated to Position D, ready to repeat the cycle.

Figure 4:
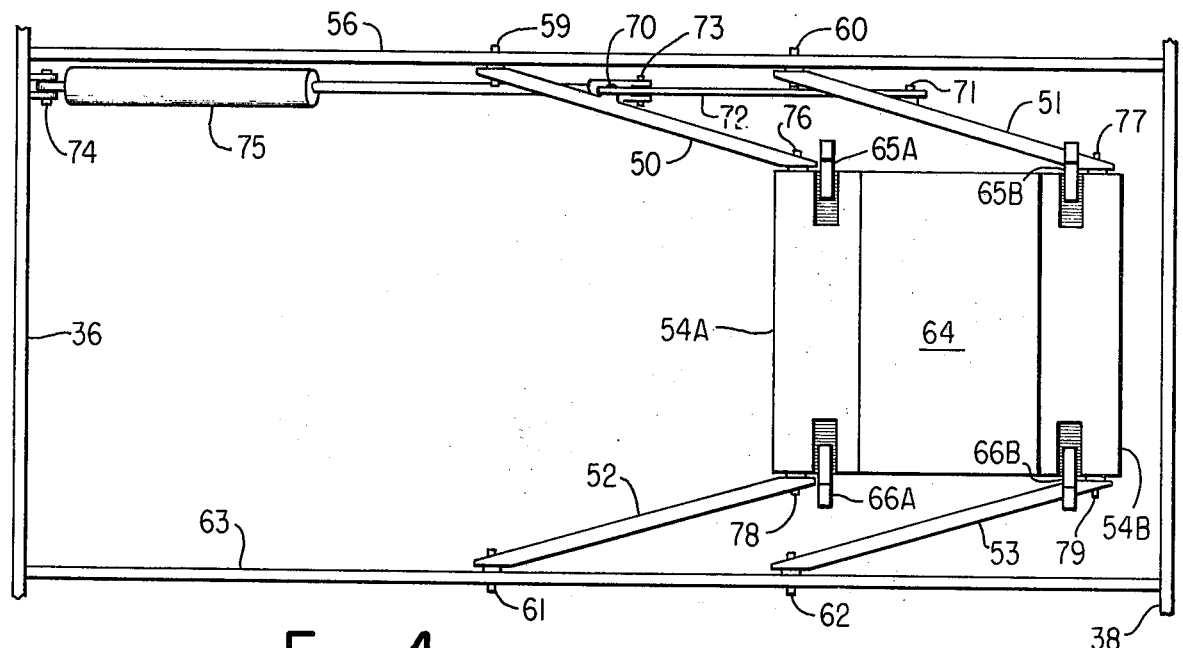

Refering now to FIGS. 4 and 5 each module 46 comprises an upper pair of levers 50 and 51 fulcrumed at points 59 and 60 to an upper cross member 56 secured to the sides 36 and 38 of cradle 34, and a similar pair of lower levers 52 and 53 fulcrumed at points 61 and 62 to a lower cross member 63 secured to the sides 36 and 38. A cross-block 64 is pivotally carried by levers 50, 51, 52 and 53 at points 76, 77, 78 and 79. Carried by the cross-block 64 are spaced apart mechanical hands 54A and 54B for grasping, holding and releasing a workpiece at predetermined points in each cycle of operation.

The mechanism incorporated in each mechanical hand 54 for grasping, holding and releasing a workpiece is illustrated in FIG. 6. As shown, incorporated in a mechanical hand 54 are alligator jaws 65 and 66 pivotally mounted in a housing 67 at points 68 and 69 respectively. Pivoted to the jaws at points 80 and 81 are toggle links 82 and 83 having their adjacent ends adapted to be operated simultaneously in clockwise and counter-clockwise directions by a servomotor 84, mounted in the housing 67, to move the jaws toward each other to grasp and hold a workpiece or to simultaneously in a counterclockwise and clockwise direction to release a workpiece.

A servomotor 75 supported on the side 36 through a bearing 74 pivotally connected at point 73 to a tie-link 72, in turn pivotally connected to levers 50, 51 at points 70, 71 is arranged to position the cross-block 64 from a retracted Position F, shown in solid line in FIG. 5, to an extended Position G, shown in dot-dash line and, vice versa, from the extended position to the retracted position. Thus generalizing, it may be said that the servomotor 75 is effective (by means of control instrumentalities, not shown) to position a module 46 from a retracted position to an extended position at predetermined points in each cycle of operation and vice versa.

When a module 46 is in the retracted position a workpiece held by the mechanical hand 54A and 54B clears the lathe and it is with both modules 46A and 46B in this position and the cradle 34 in Position C, that the carriage 24 is shuttled between Stations A and B at the appropriate points in each cycle of operation. When the carriage 24 is at Station A, with the cradle in Position C, or at Station B, with the cradle in Position D, module 46A and module 46B are sequentially extended and retracted at appropriate times to take a workpiece from the machining position, or put a workpiece in machining position, or to take a workpiece from or put a workpiece on conveyor 11.

With upper levers 50, 51 of equal effective length and the distance between fulcrum points 59, 60 equal to the distance between pivot points 76, 77; and the lower linkage system being identical with the upper, it is apparent that the upper and lower linkage systems each define in outline a parallelogram and together define in outline a parallelepiped of six faces each of which is a parallelogram. As levers 50, 51 and 52, 53 are rotated from Position F to Position G or vice versa, cross-block 64 will remain parallel to the centerline of the machining position as will a workpiece carried by the mechanical hands 54A and 54B.

By maintaining the angle $\theta_1$ relatively small, not greater than 25°, as shown in FIG. 5, which is defined as the angle the levers 50, 51 and 52, 53 traverse when rotating from a neutral position wherein they are substantially in line with cross members 56, 63, respectively, to an extended position, the motion of the workpiece in approaching or retreating from the machining position is substantially linear and normal to the centerline of the machining position. Thus the mechanism brings a workpiece into machining position requiring only minor axial adjustment of spindle 8 in securing a workpiece prior to the machining operation. The angle $\theta_2$ may be as large as required, up to a maximum of 90°, to have workpieces carried by the mechanical hands clear the lathe as the carriage 24 shuttles between Stations A and B.

To meet the exigencies of particular applications, say in the machining of workpieces having a unique configuration, the invention comprehends accommodating such applications by having levers 50, 52 longer or shorter than levers 51, 53. With this arrangement a workpiece will be deposited in the machining position with its axis coincident with the centerline thereof; but will be angularly moved toward and away from the machining position.

A description of such logic circuits, control instrumentalities and the like as may be required to operate the servomotors incorporated in the machine tool automation at appropriate times in each cycle of operation have been omitted as they form no part of the present invention.

As used herein, it should be understood that the term "rough workpiece" includes any workpiece upon which the machining operation is to be performed; and that the term "finished workpiece" includes any workpiece upon which the machining operation has been completed. Further, while in the embodiment of the invention herein illustrated and described, the tool remains stationary and the workpiece revolves, it should be understood that within the scope of the invention are those applications wherein the tool revolves and the workpiece is held stationary.

We claim:

1. In machine tool automation, a put-and-take module for putting a workpiece into and taking a workpiece from the machining position of the machine tool, comprising in combination, a linkage system defining in outline a parallelogram having a pair of spaced apart levers pivotally mounted on a fixed member and a cross member pivotally supported by and maintaining said levers in parallel relationship for supporting a workpiece parallel to the machining position, and a servomotor connected to said linkage system for rotating said levers in one direction from a neutral position wherein said levers are substantially in line with said fixed member through an angle to an extended position wherein a workpiece supported by said cross member is in the machining position and in reverse direction to return said levers to the neutral position.

2. In machine tool automation as setforth in claim 1, wherein a workpiece supported by said cross member moves substantially linearly normal to the machining position as said levers rotate from the neutral to the extended position.

3. In machine tool automation as set forth in claim 2, in which the angle through which the levers are rotated from the neutral position to the extended position is less than twenty five degrees.

4. In automation for machine tools as set forth in claim 2, wherein said levers are adapted to be rotated by said servomotor in opposite direction from the neutral position through an angle to a retracted position wherein a workpiece carried by the cross member is parallel to but displaced sideways from the machine tool.

5. In machine tool automation as set forth in claim 4, in which the angle through which the levers are rotated in opposite direction from the neutral position to a retracted position is less than 90°.

6. In machine tool automation as set forth in claim 2, further including a mechanical hand mounted on said cross member comprising a pair of jaws and a servomotor operatively connected to said jaws for positioning said jaws toward each other to grasp and hold a workpiece and away from each other to release a workpiece.

7. In machine tool automation as set forth in claim 6, wherein the machine tool is a lathe having a headstock and the workpiece, when the levers are in an extended position, is placed into a machining position wherein the centerline of the workpiece is coincident with the centerline of the headstock.

8. In machine tool automation as set forth in claim 7, wherein the lathe is provided with a tailstock having a spindle in line with the headstock, a servomotor for moving said spindle toward and away from the headstock and when the levers are in an extended position the workpiece is placed into a machining position between said headstock and said spindle when positioned by said servomotor away from said headstock.

9. In machine tool automation as set forth in claim 2, wherein said put-and-take module includes a second linkage system spaced apart from said first linkage system and including a second pair of spaced apart levers mounted on a fixed member and pivotally connected to and maintained in parallel relationship by said cross member, said linkage systems together defining in outline a parallelepiped.

10. In machine tool automation as set forth in claim 9, further including a cradle in which said module is mounted, a carriage in which said cradle in rotatably mounted; and a servomotor operatively connected to said cradle for rotating said cradle relative to said carriage from a first predetermined position to a second predetermined position.

11. In machine tool automation as set forth in claim 1, further including a plurality of spaced apart put-and-take modules so arranged that a workpiece carried by any one module with the levers of the module in the extended position is in the machining position.

12. In machine tool automation as set forth in claim 11, further including a cradle in which said modules are mounted, a carriage in which said cradle is rotatable mounted, a servomotor operatively connected to said cradle for rotating said cradle relative to said carriage from a first predetermined position to a second predetermined position, a conveyor for transporting workpieces to and from the machine tool having a load and unload position, and means for shuttling said carriage between a first station wherein, with the cradle in the first predetermined position and the levers of a module in the extended position, a workpiece carried thereby is in the machining position, and a second station wherein, with the cradle in the second predetermined position and the levers of a module in the extended position, a workpiece carried thereby is in the conveyor load and unload position.

13. In machine tool automation as set forth in claim 12, wherein a first and a second module are mounted in said cradle, said first module arranged to pick up a rough workpiece from the conveyor load and unload position and place the rough workpiece in machining position, and said second module is arranged to remove a finished workpiece from the machining position and place the finished workpiece on the convey at the load and unload position.

* * * * *